United States Patent [19]

Sartoretto et al.

[11] Patent Number: 4,474,925

[45] Date of Patent: Oct. 2, 1984

[54] UREA FORMALDEHYDE DISPERSIONS MODIFIED WITH POLYFUNCTIONAL ALDEHYDES

[75] Inventors: Paul Sartoretto, North Brunswick; Prathivadibhayankaram S. Sampathkumar, Parsippany, both of N.J.

[73] Assignee: W. A. Cleary Chemical Corporation, Somerset, N.J.

[21] Appl. No.: 448,684

[22] Filed: Dec. 10, 1982

[51] Int. Cl.³ .................... C08L 61/24; C08G 12/12
[52] U.S. Cl. .................... 524/598; 71/119; 71/123; 524/843; 524/844; 528/245
[58] Field of Search ............ 528/245, 259; 524/598, 524/843, 844; 71/119, 123

[56] References Cited

U.S. PATENT DOCUMENTS

| | | | |
|---|---|---|---|
| 3,793,280 | 2/1974 | Sandler | 524/843 |
| 3,903,033 | 9/1975 | Chao | 524/843 |
| 4,244,727 | 1/1981 | Moore, Jr. | 71/29 |
| 4,298,512 | 11/1981 | Sartoretto et al. | 260/29.4 R |
| 4,332,610 | 6/1982 | Sartoretto et al. | 71/28 |

OTHER PUBLICATIONS

Official Methods of Analysis of the Association of Official Agricultural Chemists, 11th Ed., 1970 pp. 18, 19.
Karrer, Paul, "Organic Chemistry", Elsevier Pub. Co. Inc., N.Y., Amsterdam, London, Brussels, 3rd Eng. Edition, pp. 312, 313, 1947.
Cooke, T. F. and H. D. Weigmann, Textile Chemist and Colorist, vol. 14, No. 5, p. 100 (1982) and vol. 14, No. 6, p. 136 (1982).

Primary Examiner—Theodore E. Pertilla
Attorney, Agent, or Firm—Abraham Wilson

[57] ABSTRACT

An improvement in a process for the preparation of neutralized urea aldehyde polmeric dispersions by acid catalyzed reaction of urea with formaldehyde plus a higher aldehyde having from two to four carbon atoms wherein the improvement comprises reacting urea with formaldehyde and a polyfunctional aldehyde selected from the group consisting of a dialdehyde of from 2 to 5 carbon atoms or a polymer of formaldehyde such as a hydroxyaldehyde or polysaccharide which has a reactive, reducible aldehyde group wherein the mole ratio of formaldehyde to the polyfunctional aldehyde is at least 3:1. The products are useful as long term, sprayable fertilizers, especially for grasses.

35 Claims, No Drawings

UREA FORMALDEHYDE DISPERSIONS MODIFIED WITH POLYFUNCTIONAL ALDEHYDES

BACKGROUND OF THE INVENTION

This invention relates to dispersions useful as slow release nitrogen fertilizers, to processes for preparing such dispersions and to their application to plants and soils. More particularly, the invention relates to dispersions formed during reactions of urea and formaldehyde, when these reactions are carried out in the presence of polyfunctional aldehydes or "polymers of formaldehyde" such as polysaccharides capable of being hydrolyzed to hydroxyaldehyde compounds. Typically, polyfunctional aldehydes may be dialdehydes of from 2 to 5 carbon atoms, hydroxyaldehydes of from 3 to 6 carbon atoms or polymers of formaldehyde such as reducible polysaccharides which form aldehydes under the reaction conditions.

In U.S. Pat. No. 4,298,512 and 4,332,610, Sartoretto and Tao, a process is described for preparing a dispersion of a urea aldehyde polymer for use in fertilizing soil wherein the process comprises reacting urea with formaldehyde and a higher aldehyde having from 2 to 4 carbon atoms such as acetaldehyde and propionaldehyde, wherein the mole ratio of formaldehyde to said higher aldehyde is at least 2:1, in aqueous solution in the presence of an acid catalyst to form a dispersion and to neutralize the dispersion.

In U.S. Pat. No. 4,033,745, to Moore, which is referred to in the prior patents mentioned above, alcohol and sugar additives including molasses are used to enhance the stability of suspensions of urea formaldehyde polymers. However the sugars used in the Moore patent are crude solutions of sucrose. The prior art has not described the use of substituted of polyfuncational aldehydes in reactions of urea and formaldehyde in the preparation of fertilizers. Sucrose, as discussed in the Moore patent, not being a disaccharide capable of acting as a reducing sugar, even upon hydrolysis, is not a sugar contemplated for use in this invention which requires aldehyde groups or the potential formation of aldehyde groups under the reaction conditions.

According to the present invention, it has been found that dialdehydes or hydroxyaldehydes may be used as chain terminators to apparently reduce the molecular weight of the polymers formed so that stable dispersions are formed which are storable for long periods of time. Various thickener-suspending agents are added to the dispersions to minimize settling. The dispersions are made water redispersible, after they are sprayed onto leaves and plants and on the soil, by the incorporation of surfactants into the dispersions.

It is an object of this invention to prepare stable, aqueous dispersions of urea-aldehyde polymers which release nitrogen to plants in a controlled manner over a relatively long period of time.

It is another object of this invention to produce dispersions of urea-aldehyde polymers which are capable of being stored for relatively long periods of time and then being readily applied to growing plants and soil without difficulty by conventional spraying equipment.

It is a further object of this invention to prepare dispersions of urea-aldehyde polymers which release nitrogen to growing plants over relatively long periods of time without causing phytotoxicity of the plants.

SUMMARY OF THE INVENTION

Stable urea-aldehyde dispersions in aqueous medium, useful as sprayable fertilizers, are prepared according to the invention by the acid catalysis reaction of urea, formaldehyde and a dialdehyde having from 2 to 5 carbon atoms or a hydroxyaldehyde having from 3 to 6 carbon atoms.

The precise reactions of these polyfunctional aldehydes or polymers of formaldehyde with urea or urea formaldehyde products are not known with specificity, but it is believed that the polyfunctionality of the dialdehydes and hydroxyaldehydes permits the development of the desirable properties that are displayed by these compounds when they are used as chain terminators. In general dialdehydes and hydroxyaldehydes have greater water solubility than similar monofunctional aldehydes of the same chain length.

Generally the useful range of urea/nitrogen concentrations is from about 5% to 18% (as nitrogen by weight) with a preferred nitrogen content of about 13% to 17%. The molar ratio of urea to total aldehydes may be from about 1:1 to 2.5:1. with a preferred range of about 1.3:1 to 2:1. The molar ratio of formaldehyde to dialdehydes or hydroxyaldehydes is from about 3:1 to 99:1 with a preferred range for formaldehyde to dialdehyde of from about 3:1 to 50:1 and a preferred range for formaldehyde to hydroxyaldehyde of from about 3:1 to 49:1.

The dispersions formed by the processes of this invention are stable and may be sprayed from conventional spraying equipment. When the dispersions are further stabilized by the addition of thickener-suspending agents, their shelf life without aggregation is prolonged. Dispersions perpared by this invention are useful as slow release nitrogen fertilizers when applied to soil and growing plants.

DETAILED DESCRIPTION OF THE PREFERRED EMBODIMENTS

Dialdehydes in the range of $C_2$ (glyoxal) to $C_5$ (glutaric dialdehyde) are useful in this invention where the formaldehyde to dialdehyde ratio may be about 3:1–99:1 and the preferred ratio is about 3:1–50:1. However both the $C_3$ and $C_4$ dialdehydes are unstable and unsuitable for use as chain terminators. Dialdehydes having more than 5 carbon atoms are also generally unstable and unsuitable for use in this invention. Because glyoxal is a dialdehyde useful as a chain terminator in preparing the dispersions of this invention, it should be noted that it is used on a large scale in a vapor phase synthesis with urea and formaldehyde to form dimethylodihydroxyethyleneurea (DMDHEU). However the urea to aldehyde ratio used in the preparation of DMHDEU is 1:3 and the formaldehyde to glyoxal ratio is 2:1 is contrasted with the useful ranges of this invention of urea to aldehyde ratio of from about 1:1 to 2.5:1 and the formaldehyde to dialdehyde (glyoxal) ratio of from about 3:1 to 99:1. DMDHEU is used to provide durable press properties upon reaction with cellulosic fabrics. A recent review of the literature of such compounds provides additional examples of durable press compounds. See Cooke, T. F. and H. -D. Weigmann, Textile Chemist and Colorist, Vol 14, No. 5, p 100 (1982) and Vol 14, No. 6, p 136 (1982).

The hydroxyaldehydes, which may be regarded as polymers of formaldehyde, from $C_3$ ((DL) glyceraldehyde) to $C_6$ (hexoses) have been found to be generally useful in stabilizing urea-aldehyde dispersions when the ratio of formaldehyde to hydroxyaldehyde is from about 3:1–99:1, the preferred ratio being from about 3:1–49:1. Only those compounds having an aldehyde group available for reaction with the urea are expected to work satisfactorily. The reducing sugars ribose, arabinose and xylose have been used by us to demonstrate their ability to effectively stabilize urea aldehyde dispersions. Although D-glucose exists mainly in the hemiacetal form, it is a reducing sugar and it works very well since the aldehyde group appears to be available for reaction with the urea. D-fructose having a ketone structure, is not useful. Of polymers of formaldehyde having chain lengths greater than $C_6$ which yield hexoses upon hydrolysis, it is important to note that disaccharides which are easily hydrolyzed to reducing hexoses may also function as useful chain terminators. Polysaccharides not resembling sugars, such as the starches, glycogen, inulin, lichenin and cellulose break down upon acid catalysis, the final product upon complete hydrolysis often being D-glucose, which is a hydroxyaldehyde of this invention. Thus, in principle, these forementioned disaccharides and polysaccharides not resembling sugars may yield the hydroxyaldehydes disclosed by this invention if the reaction is carried out in such a way as to allow substantial hydrolysis to take place.

Glyoxal is the preference dialdehyde when used in a preferred ratio of formaldehyde to glyoxal of from about 3:1 to about 50:1.

(DL) glyceraldehyde is the preference hydroxyaldehyde when used in a preferred ratio of formaldehyde to (DL) glyceraldehyde of from about 3:1 to about 49:1.

Other dialdehydes and hydroxyaldehydes may be useful and reference to the compounds above is not intended to limit this invention to those which are described.

The stability of the aqueous dispersions which are formed by the reaction of urea with formaldehyde and the above chain terminators may be enhanced by the addition of thickener-suspending agents. Typical thickener suspending agents are Xanthan gums, carboxymethycellulose and microcrystalline cellulose, etc., in amounts of from about 0.01% to 1% and in preferred amounts of from about 0.3% to 0.1%.

Redispersability of the solids on the plants and soil after spraying is achieved by incorporating non-ionic surfactants in amounts of from about 0.1% to 5% and in preferred amounts of from about 0.5% to 2%.

The amounts of thickener-suspending agents or surfactants are for illustration only and may be varied by those skilled in the art.

The preparation of a stable dispersion of urea formaldehyde and hydroxyaldehyde or dialdehyde generally starts by dissolving the constitutents in water while carefully controlling the temperature so that the reaction temperature is limited so as not to go above about 65° C. Generally dilute sulfuric acid is used for the acidification but any other suitable acid may be used for the adjustment. The reactions are terminated by adjusting the pH to about 7.0–9.0 and cooling.

Any strong inorganic base may be used in adjusting the pH and caustic potash has been generally used in the examples given below.

The abbreviation U. F. C. -85 is a term which has been used by the Allied Chemical Corporation to identify a product which contains 60% formaldehyde, 25% urea and 15% water. This designation has not been registered as a trademark by the Allied Chemical Corporation. Other manufacturers supply a more or less identical product using names which are known to the people in the trade. We refer to its use in the examples below where it shall be understood to mean only that the composition is 60% formaldehyde, 25% urea and 15% water. Use of this preparation allows the introduction of a concentrated formaldehyde solution with less evolution of heat than would occur if the same resulting concentration of formaldehyde were introduced directly to a urea solution.

The abbreviations "WIN", "HWIN" and "CWIN" are used in some of the examples which follow. These stand for "water insoluble nitrogen", "hot water insoluble nitrogen" and "cold water insoluble nitrogen" respectively. The method for quantitative determinations of these designated types of nitrogen are given in the official methods of analysis of the Association of Official Agricultural Chemists, 11th Ed., 1970.

The following examples will serve to further illustrate the preferred embodiments of this invention.

EXAMPLE 1

This example demonstrates the preparation of a stable aqueous urea-aldehyde dispersion using glyoxal as a chain terminator.

About 261.2 g (4.35 moles) of urea, 137.8 g of UFC-85 (2.75 moles of formaldehyde and 0.57 moles of urea) and 20.3 g of a 40% aqueous solution of glyoxal (0.14 moles) were mixed in about 110 g of water. The pH was adjusted to about 4.0 by the addition of dilute sulfuric acid and the reacting system heated, while being continuously stirred until the temperature reached about 60° C. over a period of about 105 minutes. The reaction was then terminated by the addition of caustic potash to bring the pH to about 7.8. The reaction mixture was then cooled and about 0.4 g of a thickener-suspending agent, a xanthan gum dispersed in propylene glycol was added.

The urea to aldehyde molar ratio was about 1.7:1 and the formaldehyde to glyoxal ratio was about 19:1.

The nitrogen content was found by analysis to be about 17% by weight distributed as follows:

As Free Urea=12%
As Soluble Urea Aldehyde=16%
As WIN=72%
of which
  CWIN=32% and
  HWIN=40%.

The initial "Brookfield" viscosity was about 160 cps and after more than four months was about 1200 cps with no syneresis.

EXAMPLE 2

We demonstrate by this example the use of glyoxal as a chain terminator wherein the relative amount of glyoxal is increased so that the formaldehyde to glyoxal ratio is decreased relative to Example 1.

About 658.5 g of 50% aqueous urea solution (5.49 moles), 162.9 g of UFC-85 (3.26 moles of formaldehyde and 0.68 moles of urea) and 52.2 g of a 40% aqueous solution of glyoxal (0.36 moles) were mixed together followed by an adjustment of the pH to about 4.0 with the addition of dilute sulfuric acid. The reaction system was then heated to about 60° C. while being continuously stirred over a period of about 105 minutes and then terminated by the addition of caustic potash until the pH reached about 8.0.

The dispersion was then cooled and a mixture containing about 0.3 g of sodium carboxymethyl cellulose and about 0.3 g of a thickener-suspending agent, a xanthan gum, both dispersed in propylene glycol, was slowly added.

The urea to aldehyde ratio was about 1.7:1 and the formaldehyde to glyoxal ratio was about 9:1.

The nitrogen content was found by analysis to be about 17% by weight distributed as follows:
As Free Urea=17.8%
As Soluble Urea Aldehyde=59%
As WIN=23.2%
of which
CWIN=18.9%
HWIN=4.3%

The initial "Brookfield" viscosity was about 140 cps reaching about 2000 cps after more than two months with no evidence of syneresis.

EXAMPLE 3

This example demonstrates the use of glutaric dialdehyde as a chain terminator and also the effect of nitrogen concentration on dispersion stability in the preparation of urea aldehyde dispersions.

To about 2128 g of a 50% aqueous solution of urea (17.73 moles) were added about 440 g of UFC-85 concentrate (8.8 moles of formaldehyde and 1.83 moles of urea), 392 g of a 25% aqueous solution of glutarix dialdehyde (0.98 moles) and 25 g of water with stirring. The pH of the mixture was adjusted to about 4.0 with dilute sulfuric acid. The reaction mixture was continuously stirred and heated to a temperature of about 60° C. over a period of about 100 minutes. The reaction was terminated by adjusting the pH to about 8.0 with caustic potash.

The dispersion was then cooled and a mixture containing about 0.9 g of sodium carboxymethyl cellulose and about 0.9 g of xanthan gum, both dispersed in propylene glycol, was slowly added with stirring.

As prepared the urea to aldehyde ratio was about 2:1 and the formaldehyde to glutaric dialdehyde ratio was about 9:1. The nitrogen content as prepared was about 18%. In order to study the effect of concentration, the batch was divided into three parts and water added to two of the parts so as to dilute the system to about 17% and 16% respectively. The "Brookfield" viscosities of each of the dispersions was then measured with the following results:
18%: 75 cps
17%: 55 cps
16%: 55 cps After more than two months the viscosities were:
18%: gelled
17%: 560 cps
16%: 390 cps.

This example shows that, for certain systems, it is preferable to keep the total solids below the concentration that would result in about 18% nitrogen by weight.

EXAMPLE 4

This example demonstrates the effectiveness of a high ratio of formaldehyde to glutaric dialdehyde in the preparation of a stable urea aldehyde dispersion.

To about 639.2 g of a 50% aqueous solution of urea (5.32 moles) were added about 201 g of UFC-85 concentrate (4.02 moles of formaldehyde and 0.837 moles of urea), 32 g of a 25% aqueous solution of glutaric dialdehyde (0.08 moles) and 129 g of water with stirring. The pH of the mixture was adjusted to about 4.0 with dilute sulfuric acid and the mixture heated with stirring to about 63° C. over a period of about 90 minutes. The reaction was terminated by adjusting the pH to about 8.0 by the addition of caustic potash.

After the dispersion was cooled to ambient temperature a mixture containing about 0.3 g of sodium carboxymethyl cellulose and about 0.3 g of a xanthan gum, dispersed in propylene glycol, was added with stirring.

The urea to aldehyde ratio of the resulting dispersion was about 1.5:1 and the formaldehyde to glutaric dialdehyde ratio was about 50:1. The nitrogen content was about 17%. The initial "Brookfield" viscosity was about 130 cps and was about 1060 cps after eleven weeks with no sign of syneresis or gelling.

EXAMPLE 5

This example demonstrates the effectiveness of (DL)glyceraldehyde as a chain terminator in the preparation of urea-aldehyde dispersions.

To about 170.7 g of an aqueous solution of urea (1.42 moles) were added about 28.68 g of UFC-85 concentrate 17.56 g of (DL)-glyceraldehyde (0.195 moles) and 30 g of water with stirring. The pH of the mixture was adjusted to about 4.0 with dilute sulfuric acid and heated to about 60° C. in about ninety minutes. The reaction was terminated by adjusting the pH to about 8.1 by the addition of caustic potash.

After the dispersion was cooled to ambient temperature, about 0.125 g of a xanthan gum dispersed in propylene glycol was added with stirring.

The urea to aldehyde ratio of the resulting dispersion was about 2:1 and the formaldehyde to (DL)-glyceraldehyde ratio was about 3:1. The nitrogen content was about 17%. The initial "Brookfield" viscosity was about 100 cps and about two months later was only about 190 cps demonstrating the extreme dispersibility of this system. No syneresis was evident.

EXAMPLE 6

This example illustrates the preparation of a stable aqueous urea aldehyde dispersion using (DL)-glyceraldehyde, in a different formulation than the previous example, as a chain terminator.

To about 311.7 g of a 50% aqueous solution of urea (2.594 moles) were added about 116.2 g of UFC-85 (2.33 moles of formaldehyde and 0.48 moles of urea), 4.5 g of (DL)-glyceraldehyde (0.05 moles) and 63 g of water with stirring. The pH was adusted to about 4.0 by the addition of 1:1 sulfuric acid and the reaction mixture heated with stirring to reach about 60° C. in about 90-105 minutes. The reaction was terminated by adding caustic potash so as to change the pH to about 8.2.

After cooling the dispersion to ambient temperature, about 0.15 g sodium carboxymethyl cellulose and about 0.15 g of a xanthan gum dispersed in propylene glycol were slowly added with stirring.

The urea to aldehyde molar ratio was about 1.3:1 and formaldehyde to (DL)-glyceraldehyde ratio was about 46:1.

The nitrogen content was about 17% by weight and was found by analysis to be distributed as follows:
As soluble nitrogen=74.84%
As WIN=25.16%
of which
CWIN=5.25%
HWIN=19.91%

The initial "Brookfield" viscosity was about 120 cps and after about four months was about 280 cps. No syneresis was evident.

EXAMPLE 7

This example demonstrates the preparation of a stable aqueous urea aldehyde dispersion using glucose as a chain terminator.

About 318.3 g of urea (5.30 moles), 178.9 g of UFC-85 (3.574 moles of formaldehyde and 0.74 moles of urea), 14.4 g of glucose (0.08 moles) and 318.3 g of water were mixed with stirring and the pH adjusted to about 4.0 by the addition of dilute sulfuric acid. The reaction mixture was then heated, while being continuously stirred, until the temperature reached about 60° C. over a period of about 100 minutes. The reaction was then terminated by adding caustic potash to adjust the pH to about 8.0. The reaction mixture was then cooled to ambient temperature and about 0.3 g of sodium carboxymethyl cellulose and about 0.3 g of xanthan gum both dispersed in propylene glycol were added with stirring.

The urea to aldehyde molar ratio was about 1.65:1 and the formaldehyde to glucose molar ratio about 45:1. The nitrogen content was about 16.7%.

The initial "Brookfield" viscosity was about 50 cps and about 1620 cps after about five months. No syneresis was exhibited.

EXAMPLE 8

A non-reducing carbohydrate does not act as a chain terminator in the preparation of urea-aldehyde dispersions.

To about 653.12 of a 50% aqueous solution of urea (5.43 moles) were added about 171.95 g of UFC-85 (3.44 moles of formaldehyde and 0.72 moles of urea), 34.11 g of fructose (0.19 moles) and 135 g of water with stirring. The pH was adjusted to about 4.0 by the addition of dilute sulfuric acid and the mixture heated with stirring to about 60° C. in about 90-105 minutes. The reaction was then terminated by adding caustic potash to adjust the pH to about 8.0

After cooling the dispersion to ambient temperature about 0.5 g of a xanthan gum dispersed in propylene glycol was added with vigorous stirring.

The urea to formaldehyde plus fructose mole ratio was about 1.7:1 and the formaldehyde to fructose mole ratio was about 18:1.

The initial "Brookfield" viscosity was about 205 cps but increased rapidly to about 1000 cps within 24 hours and solidification to within a week.

EXAMPLE 9

A non-reducible disaccharide does not act as a chain terminator in the preparation of urea-aldehyde dispersions.

To about 650.42 g of a 50% aqueous solution of urea (5.417 moles) were added about 177.38 g of UFC-85 (3.54 moles of formaldehyde and 0.74 moles of urea), 24.76 g of sucrose (0.072 moles) and 146 g of water with stirring. The pH was adjusted to about 4.0 by the addition of dilute sulfuric acid and the mixture heated with stirring to about 60° C. in about 100 minutes. The reaction was then terminated by adding caustic potash to adjust the pH to about 8.5

After cooling to ambient temperature, about 0.5 g of a xanthan gum dispersed in propylene glycol was added to the dispersion with vigorous stirring.

The urea to formaldehyde plus sucrose mole ratio was about 1.7:1 and the formaldehyde to sucrose mole ration was about 49:1.

The dispersion solidified in about two days.

EXAMPLE 10

This example demonstrates the application of the dispersion of Example 1 to a 5'×10' plot of turf. The test was conducted at Iowa State University on Kentucky Blue Grass varietals.

About twenty four ml of dispersion were diluted with an equal volume of water to correspond to an application equivalent to two lbs of actual N per 1000 sq. ft. of turf. The dispersion was sprayed at about 29.4° C. without watering. The plot was observed for several days for any sign of tip burn and/or burning of the grass and no damage to grass tip or blade was noticed compared to a control using urea solution at the same rate and conditions. Urea solution caused burning and irreparable damage to about one third of the grass. Satisfactory greening occurred as a result of the test application of the dispersion and remained for a period of about six weeks.

We claim:

1. In a process for preparing a dispersion of a urea aldehyde polymer for use as a sprayable fertilizer in which urea is reacted with formaldehyde and a higher aldehyde having from 2 to 4 carbon atoms, wherein the mole ratio of formaldehyde to said higher aldehyde is at least 2:1, in aqueous medium in the presence of an acid catalyst to form a dispersion of urea aldehyde polymer in said aqueous medium and said dispersion is neutralized; the improvement which comprises: reacting urea with formaldehyde and a polyfunctional aldehyde selected from the group consisting of a dialdehyde having from 2 to 5 carbon atoms and a polymer of formaldehyde which has a reactive, reducible aldehyde group wherein the mole ratio of formaldehyde to said polyfunctional aldehyde is at least 3:1.

2. The process of claim 1 wherein said polyfunctional aldehyde is a hydroxyaldehyde having from 3 to 6 carbon atoms.

3. The process of claim 1 wherein the nitrogen concentration in said dispersions is from about 5% to 18% based on the weight of nitrogen in the urea.

4. The process of claim 1 wherein the mole ratio of urea to formaldehyde and polyfunctional aldehyde is from about 1:1 to 2.5:1.

5. The process of claim 1 wherein the mole ratio of formaldehyde to polyfunctional aldehyde is from about 3:1 to 99:1.

6. The process of claim 1 wherein said dispersion is neutralized to a pH of from about 7 to about 9.

7. In a process for preparing a dispersion of urea aldehyde polymer for use as a sprayable fertilizer in which urea is reacted with formaldehyde and a higher aldehyde having from 2 to 4 carbon atoms, wherein the mole ratio of formaldehyde to said higher aldehyde is at least 2:1, in aqueous medium in the presence of an acid catalyst to form a dispersion of urea aldehyde polymer in said aqueous medium and said dispersion is neutralized;

the improvement which comprises:
reacting urea with formaldehyde and a dialdehyde having from 2 to 5 carbon atoms wherein the mole ratio of formaldehyde to said dialdehyde is at least 3:1.

8. The process of claim 7 wherein the nitrogen concentration in said dispersion is from about 5% to 18% based on the weight of nitrogen in the urea.

9. The process of claim 7 wherein the mole ratio of urea to formaldehyde is from about 1:1 to 2.5:1.

10. The process of claim 7 wherein the mole ratio of formaldehyde to dialdehyde is from about 3:1 to 99:1.

11. The process of claim 7 wherein said dispersion is neutralized to a pH of from about 7 to about 9.

12. The process of claim 7 wherein said dialdehyde is glyoxal, the mole ratio of urea to formaldehyde and glyoxal is from about 1.3:1 to 2:1, the mole ratio of formaldehyde to glyoxal is from about 3:1 to 50:1 and the nitrogen is from about 13% to 17% based on the weight of nitrogen in the urea.

13. In a process for preparing a dispersion of a urea aldehyde polymer for use as a sprayable fertilizer in which urea is reacted with formaldehyde and a higher aldehyde having from 2 to 4 carbon atoms, wherein the mole ratio of formaldehyde to said higher aldehyde is at least 2:1, in aqueous medium in the presence of an acid catalyst to form a dispersion of urea aldehyde polymer in said aqueous medium and said dispersion is neutralized; the improvement which comprises:
reacting urea with formaldehyde and a hydroxyaldehyde having from 3 to 6 carbon atoms wherein the mole ratio of formaldehyde to said hydroxyaldehyde is at least 3:1.

14. The process of claim 13 wherein the nitrogen concentration in said dispersion is from about 5% to 18% based on the weight of the nitrogen in the urea.

15. The process of claim 13 wherein the mole ratio of urea to formaldehyde is from about 1:1 to 2.5:1.

16. The process of claim 13 wherein the mole ratio of formaldehyde to hydroxyaldehyde is from about 3:1 to 99:1.

17. The process of claim 13 wherein said dispersion is neutralized to a pH of from about 7 to about 9.

18. The process of claim 13 wherein said hydroxyaldehyde is glutaric dialdehyde, the mole ratio of urea to formaldehyde and glutaric dialdehyde is from about 1.3:1 to 2:1, the mole ratio of formaldehyde to glutaric dialdehyde is from about 3:1 to 49:1 and the nitrogen concentration in said dispersion is from about 13% to 17% based on the weight of nitrogen in the urea.

19. In a process for preparing a dispersion of urea aldehyde polymer for use as a sprayable fertilizer in which urea is reacted with formaldehyde and a higher aldehyde having from 2 to 4 carbon atoms, wherein the mole ratio of formaldehyde to said higher aldehyde is at least 2:1, in aqueous medium in the presence of an acid catalyst to form a dispersion of urea aldehyde polymer in said aqueous medium and said dispersion is neutralized; the improvement which comprises: reacting urea with formaldehyde and a polysaccharide which may be hydrolyzed to form a compound having a reactive, reducible aldehyde group wherein the mole ratio of formaldehyde to said polysaccharide is at least 3:1.

20. The process of claim 19 wherein the nitrogen concentration in said dispersions is from about 5% to 18% based on the weight of nitrogen in the urea.

21. The process of claim 19 wherein the mole ratio of urea to formaldehyde and polysaccharide is from about 1:1 to 2.5:1.

22. The process of claim 19 wherein the mole ratio of formaldehyde to polysaccharide is from about 3:1 to 99:1.

23. The process of claim 19 wherein said dispersion is neutralized to a pH of from about 7 to about 9.

24. In a process for preparing a dispersion of a urea aldehyde polymer for use as a sprayable fertilizer in which urea is reacted with formaldehyde and a higher aldehyde having from 2 to 4 carbon atoms, wherein the mole ratio of formaldehyde to said higher aldehyde is at least 2:1, in aqueous medium in the presence of an acid catalyst to form a dispersion of urea aldehyde polymer in said aqueous medium, said dispersion is neutralized, a thickener-suspending agent is added and a non-ionic surfactant is added; the improvement which comprises:
reacting urea with formaldehyde and a polyfunctional aldehyde selected from the group consisting of a dialdehyde having from 2 to 5 carbon atoms and a polymer of formaldehyde which has a reactive reducible aldehyde group wherein the mole ratio for formaldehyde to said polyfunctional aldehyde is at least 3:1.

25. The process of claim 24 wherein said polyfunctional aldehyde is a hydroxyaldehyde having from 3 to 6 carbon atoms.

26. The process of claim 24 wherein the nitrogen concentration in said dispersions is from about 5% to 18% based on the weight of nitrogen in the urea.

27. The process of claim 24 wherein the mole ratio of urea to formaldehyde and polyfunctional aldehyde is from about 1:1 to 2.5:1.

28. The process of claim 24 wherein the mole ratio of formaldehyde to polyfunctional aldehyde is from about 3:1 to 99:1.

29. The process of claim 24 wherein said dispersion is neutralized to a pH of from about 7 to about 9.

30. The product comprising the dispersion prepared by the process of claim 1.

31. A product comprising the dispersion prepared by the process of claim 7.

32. A product comprising the dispersion prepared by the process of claim 13.

33. A product comprising the dispersion prepared by the process of claim 19.

34. A product comprising the dispersion prepared by the process of claim 24.

35. The process of claim 24 where said polyfunctional aldehyde is a polysaccharide which may be hydrolyzed to form a compound having a reactive, reducible aldehyde group.

* * * * *